No. 662,092. Patented Nov. 20, 1900.
A. ROESCH.
AUTOMATIC TEMPERATURE REGULATOR FOR WATER HEATERS.
(Application filed June 7, 1897.)
(No Model.)
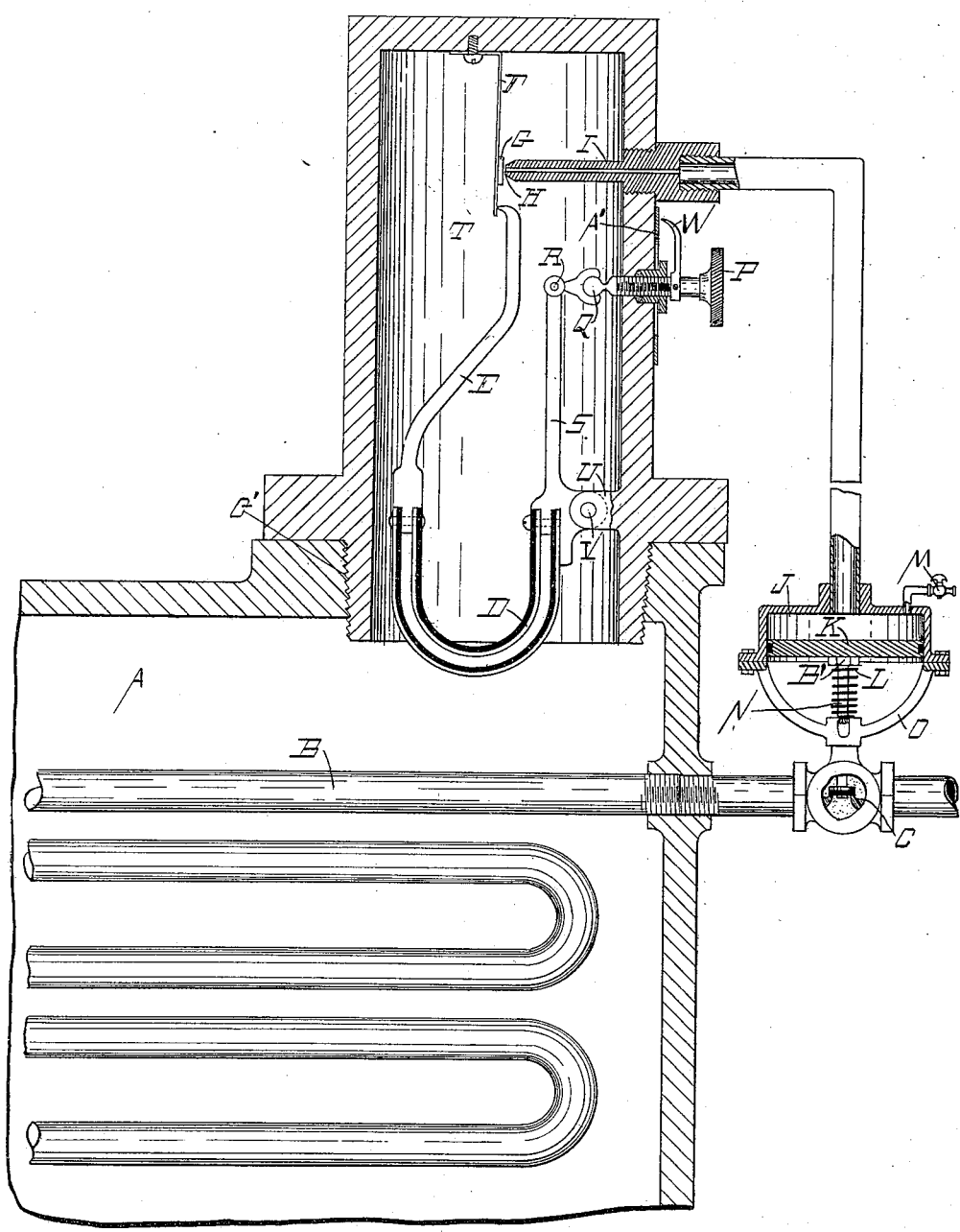
Witnesses. Inventor.
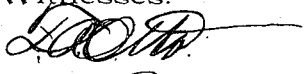 
Attorneys

United States Patent Office.

ALFRED ROESCH, OF BRIDGEPORT, CONNECTICUT, ASSIGNOR TO THE DAVIS & ROESCH TEMPERATURE CONTROLLING COMPANY, OF NEW JERSEY.

AUTOMATIC TEMPERATURE-REGULATOR FOR WATER-HEATERS.

SPECIFICATION forming part of Letters Patent No. 662,092, dated November 20, 1900.

Application filed June 7, 1897. Serial No. 639,757. (No model.)

*To all whom it may concern:*

Be it known that I, ALFRED ROESCH, a citizen of the United States, residing at Bridgeport, in the county of Fairfield and State of Connecticut, have invented new and useful Improvements in Automatic Temperature-Regulators for Water-Heaters, of which the following is a specification.

My invention relates to improvements in devices for automatically regulating the temperature of water used in so-called "water-heaters."

The construction of my device is explained by reference to the accompanying drawing, which represents a side view thereof, part in section.

The respective parts are referred to by reference-letters.

A represents a tank connected with an ordinary city water-supply under pressure, in which tank the water is heated from the steam-coil B preparatory to being circulated through the several compartments of a building. The admission of steam to the coil B is controlled by the valve C. The valve C is actuated by a change of temperature of the water in the tank A. When the temperature of the water in the tank A is raised, the free end of a thermostat D is thrown outward toward the left, carrying with it the arm E and the spring F, whereby the valve G is moved from the valve-seat H, communicating with the duct I, which in turn communicates with the chamber J.

The chamber J is provided with a piston K. It will be obvious that when the valve G is opened the water under pressure in the tank A will be caused to pass into the chamber J, whereby the piston K is forced downward, carrying with it the valve-stem L, whereby the valve C, which is affixed to the lower end of said stem, is closed and the further admission of steam to the tank A is cut off. The admission of steam being thus stopped, the temperature of the water in the tank A is lowered, whereby the free arm of the thermostat D is caused to contract or bend inward toward the right, carrying with it the arm E, thus permitting the spring F and the valve G to be thrown toward the right, whereby the valve-seat H is closed and the further admission of water to the chamber J from the tank A is cut off. It is obvious that, if desired, a diaphragm may be substituted for the piston K for actuating the valve-stem L.

The chamber J is provided with an escape-cock M, which is adjusted to permit the water therein to escape slowly. An expansion-spring N is located between the chamber-supporting yoke O and the piston K, which spring is compressed by the action of said piston when forced downward, as previously described. The valve G being closed and the further admission of water to the chamber J being thereby stopped, the piston K is forced upward by the recoil of said spring N when the water above the piston in said chamber J escapes through the cock M, whereby the valve C is raised and the steam is again admitted to the coil B.

The cock M is so adjusted that the water will escape therefrom slowly, while the capacity of the duct I is so much greater than the cock M that when the valve G is open the excess of the water entering the chamber J over that which escapes through the cock M will promptly actuate the piston K in the manner described, while the escape of water from the cock M gradually releases the pressure of the water on the piston K as soon as the valve G is closed, thereby permitting said piston to be thrown upward by the action of the spring, as described, and the valve C to be gradually opened, whereby the admission of steam to the coil B is governed, as stated, to correspond with the temperature of the water heated by such coil.

The thermostat D is adjusted for maintaining the water in the tank A at a higher or lower temperature, as desired, by the hand-screw P, which is connected with the thermostat by the ball-joint Q, pivotal joint R, and lever S, to which lever S one arm of the thermostat D is affixed. The thermostat D and lever S are supported from the walls of the chamber T by the lugs U and pivotal bolt V. It will be obvious that by turning the hand-screw P forward the arm S will be thrown inward toward the center of the chamber T, whereby the arm E will be caused to bear more forcibly against the spring F, whereby the thermostat D is caused to act more promptly and whereby the valve G is opened with a slighter rise of temperature and the steam will be cut off more promptly and the water in the tank A maintained at a lower temperature. When, however, it is desirous to maintain the water in the tank at a higher temperature, the hand-screw P is turned slightly outward, whereby the action of the thermostat D is less prompt and a higher temperature will be reached before the valve G is opened, and as a consequence the water will be raised to a higher temperature in the tank A before the steam is cut off.

W is an indicating-arm which is affixed to the hand-screw P and turns with it.

A' represents a circular index-plate which is provided with ordinary figures or characters (not shown) by which the proper adjustment of said arm W is indicated.

B' is an adjustable nut which is threaded to the valve-rod L and bears upon the upper end of the spiral spring N, whereby said spring N as it recoils acts against the under side of said nut and forces said valve-rod and piston upward as the water escapes from the chamber J. It will be obvious that the tension and power of said spring N over said piston will be increased by turning said nut B' downward against it and that the tension of said spring will be diminished by turning said nut upward.

For convenience of construction the thermostat is preferably located in a separate or so-called "secondary" chamber T, which is connected with the tank A by a screw-threaded joint C'. It is obvious, however, that said thermostat may, if desired, be located within the tank A.

It is obvious that the piston-rod L may be connected in an ordinary manner with and used for controlling draft flues or dampers of furnaces instead of steam-controlling valves.

Having thus described my invention, what I claim as new, and desire to secure by Letters Patent, is—

1. In a temperature-regulator for a hot-water heater the combination of a tank containing water under pressure, means for applying heat to said tank, a cylinder having an exhaust-port always open communicating therewith, a communication between said tank and said cylinder, said communication being of a larger capacity than the said exhaust-port, means operated by variations in temperature of the water to open and close said communication, a piston located in said cylinder and operated in one direction by the pressure of the water in said tank, and in the other direction by a spring or its equivalent, and means connected with said piston and operated thereby for governing the application of heat to said tank, substantially as specified.

2. In a temperature-regulator for a hot-water heater the combination of a tank containing water under pressure, a steam-coil in said tank, a steam-supply pipe connected thereto, a valve in said steam-supply pipe controlling the admission of steam to said coil, a cylinder having an exhaust-port always open, a communication between said tank and said cylinder, said communication being of large capacity relatively to the said exhaust-port, means operated by the variations in temperature of the water to open and close said communication, a piston located in said cylinder and operated in one direction by the pressure of the water when said communication is opened, means for operating the piston in the opposite direction when the said communication is closed, and means operated by the movement of said piston for opening and closing the valve in said steam-pipe, substantially as specified.

3. In a temperature-regulator for a hot-water heater the combination of a tank containing water under pressure, a steam-coil in said tank, a steam-supply pipe connected thereto, a valve in said steam-supply pipe controlling the admission of steam to said coil, an outlet-port in said tank, a piston-chamber communicating with said tank through said outlet-port, an exhaust in said piston-chamber of small capacity relative to said outlet-port, a piston in said chamber, means for raising said piston when said outlet-port in said tank is closed, a rod connecting said piston with said steam-controlling valve, a valve controlling said outlet-port in said tank, a thermostat surrounded by the water in said tank, and connections between said valve controlling said outlet-port in said tank and said thermostat whereby said valve is actuated to open said port when the temperature of the water in said tank rises and close said port when said temperature falls, substantially as described.

In testimony whereof I affix my signature in the presence of two witnesses.

ALFRED ROESCH.

Witnesses:
FRED. H. DAVIS,
HAROLD FISH.